US011039072B2

(12) United States Patent
Hiro et al.

(10) Patent No.: US 11,039,072 B2
(45) Date of Patent: Jun. 15, 2021

(54) DISPLAY CONTROL APPARATUS, DISPLAY CONTROL METHOD, AND COMPUTER PROGRAM

(71) Applicant: Sony Corporation, Tokyo (JP)

(72) Inventors: Daisuke Hiro, Kanagawa (JP); Ayako Iwase, Kanagawa (JP); Lyo Takaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 15/779,185

(22) PCT Filed: Nov. 25, 2016

(86) PCT No.: PCT/JP2016/085053
§ 371 (c)(1),
(2) Date: May 25, 2018

(87) PCT Pub. No.: WO2017/126222
PCT Pub. Date: Jul. 27, 2017

(65) Prior Publication Data
US 2019/0387176 A1    Dec. 19, 2019

(30) Foreign Application Priority Data
Jan. 19, 2016    (JP) .............................. JP2016-007770

(51) Int. Cl.
*H04N 5/232* (2006.01)
*G06F 3/0488* (2013.01)

(52) U.S. Cl.
CPC ... *H04N 5/232933* (2018.08); *G06F 3/04883* (2013.01); *H04N 5/23212* (2013.01); *H04N 5/23222* (2013.01)

(58) Field of Classification Search
CPC ......... H04N 5/232933; H04N 5/23212; H04N 5/23222; G06F 3/04883
See application file for complete search history.

(56) References Cited

U.S. PATENT DOCUMENTS 8,675,089 B2 * 3/2014 Tauchi ............... H04N 5/23293
348/222.1
9,177,232 B2 * 11/2015 Yamamoto .......... G06F 3/04842
(Continued)

FOREIGN PATENT DOCUMENTS

CN        1551616 A     12/2004
CN      101000451 A      7/2007
(Continued)

OTHER PUBLICATIONS

Chinese Office Action dated Mar. 27, 2020 for corresponding Chinese Application No. 201680078696.7.

*Primary Examiner* — Lin Ye
*Assistant Examiner* — John H Morehead, III
(74) *Attorney, Agent, or Firm* — Michael Best & Friedrich LLP

(57) ABSTRACT

[Object] To provide a display control apparatus that can perform control of displaying an auxiliary line serving as aid for composition decision that satisfies the demand of the user.
[Solution] Provided is a display control apparatus including: a control unit configured to control a display mode on a screen of an auxiliary line serving as aid for composition decision at a time of image capturing, in accordance with the operation of a user that is performed on a screen. The display control apparatus can perform control of displaying an auxiliary line serving as aid for composition decision that satisfies the demand of the user.

20 Claims, 12 Drawing Sheets

(56) References Cited

U.S. PATENT DOCUMENTS

| | | | |
|---|---|---|---|
| 2009/0060490 A1* | 3/2009 | Kuwahara | A63F 13/26 396/429 |
| 2009/0310010 A1* | 12/2009 | Matsushima | G06F 3/0488 348/333.01 |
| 2011/0157406 A1 | 6/2011 | Tauchi | |
| 2011/0242348 A1* | 10/2011 | Yana | H04N 5/23293 348/222.1 |
| 2011/0304607 A1* | 12/2011 | Ito | G06T 7/251 345/419 |
| 2013/0212520 A1* | 8/2013 | Kim | G06F 3/04845 715/781 |
| 2013/0268555 A1* | 10/2013 | Utsunomiya | G06F 19/00 707/769 |
| 2014/0184841 A1* | 7/2014 | Woo | H04N 5/272 348/218.1 |
| 2014/0250406 A1* | 9/2014 | Seo | G06F 3/0484 715/781 |
| 2014/0337748 A1* | 11/2014 | Lee | G06F 3/1454 715/740 |
| 2016/0062638 A1* | 3/2016 | Yakishyn | G06F 3/04883 715/863 |
| 2016/0239148 A1* | 8/2016 | Lee | G06F 3/041661 |
| 2016/0260229 A1* | 9/2016 | Natzke | G06T 11/001 |

FOREIGN PATENT DOCUMENTS

| | | |
|---|---|---|
| CN | 102209192 A | 10/2011 |
| CN | 102377938 A | 3/2012 |
| CN | 104902176 A | 9/2015 |
| CN | 105052123 A | 11/2015 |
| JP | 2005-198035 A | 7/2005 |
| JP | 2011-211493 A | 10/2011 |
| JP | 2011-223599 A | 11/2011 |

* cited by examiner

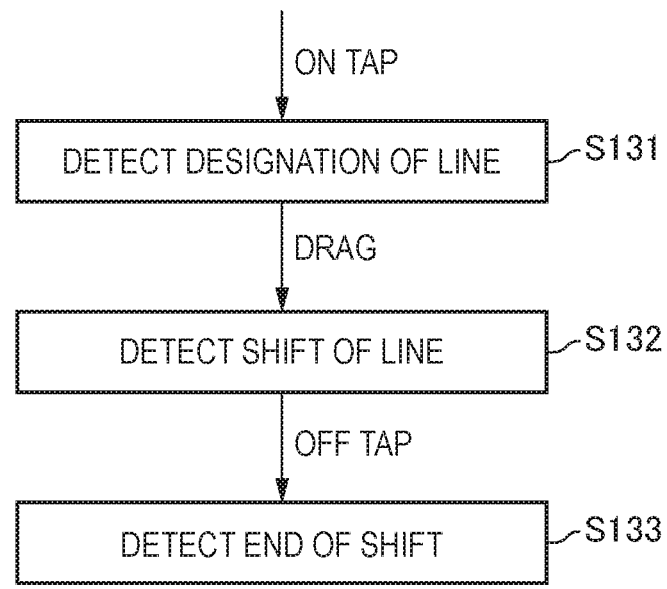
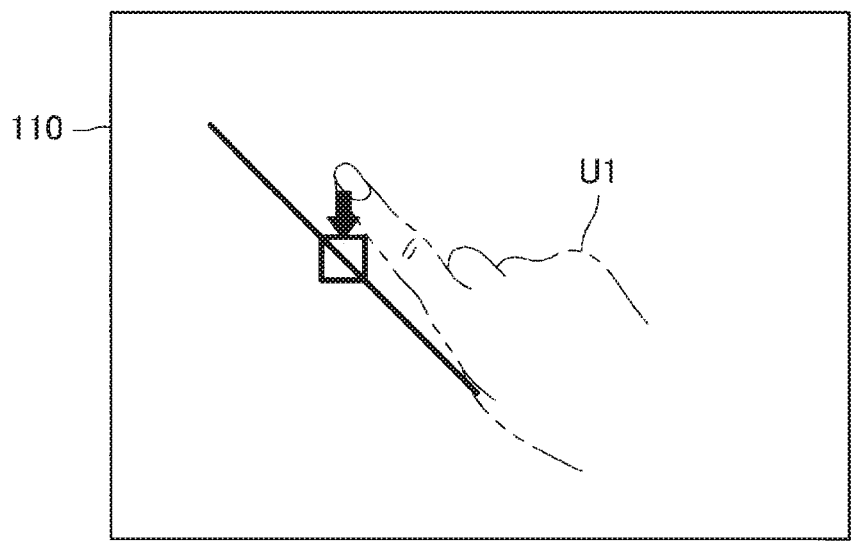

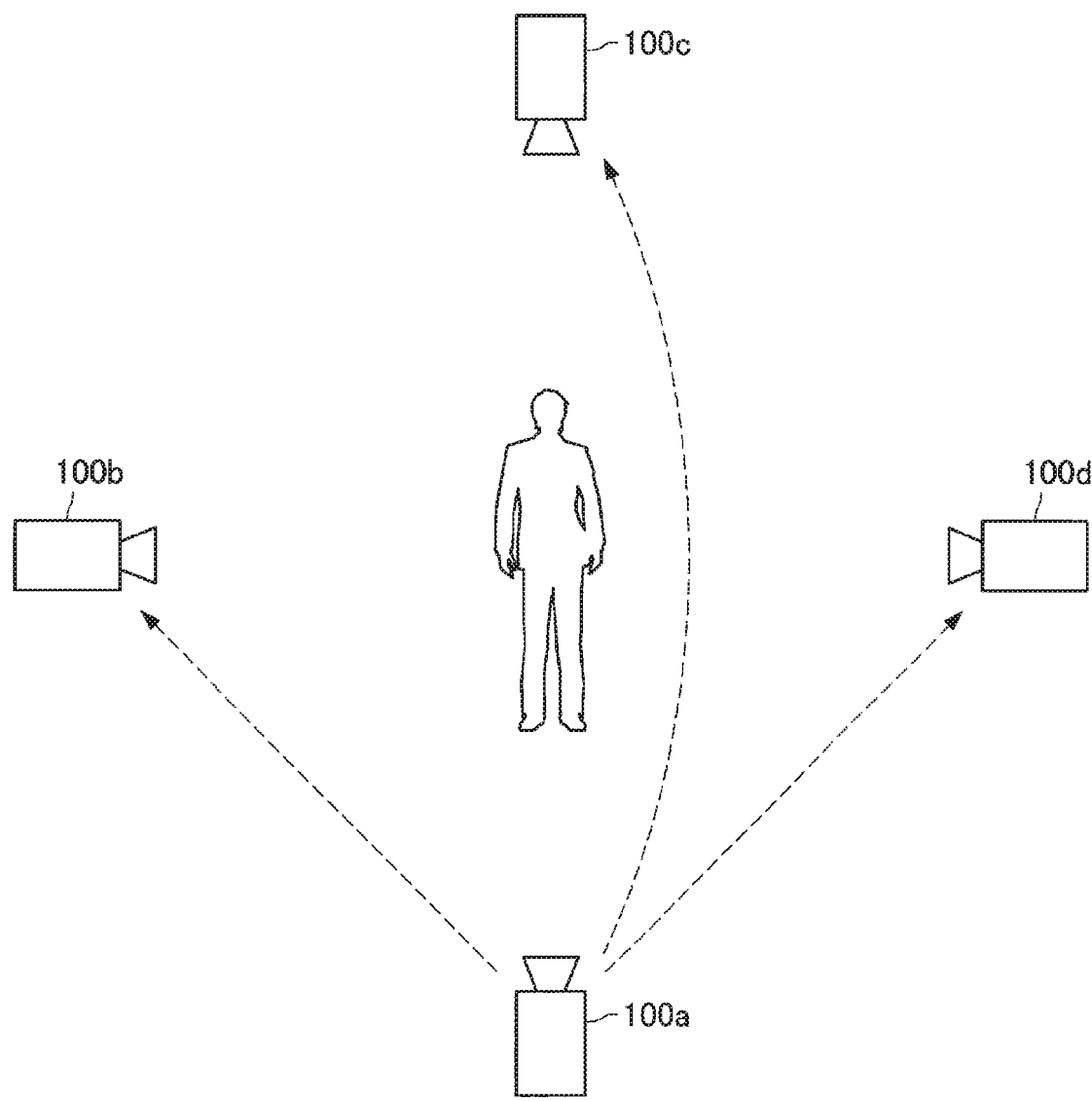

DISPLAY CONTROL APPARATUS, DISPLAY CONTROL METHOD, AND COMPUTER PROGRAM

TECHNICAL FIELD

The present disclosure relates to a display control apparatus, a display control method, and a computer program.

BACKGROUND ART

Many of digital still cameras and digital video cameras have a function of displaying, on a viewfinder or a display, a water level or an auxiliary line serving as aid for a photographer (user) to decide a composition at the time of image capturing. For example, Patent Literature 1 discloses a technology for improving visibility of an auxiliary line.

CITATION LIST

Patent Literature

Patent Literature 1: JP 2005-198035A

DISCLOSURE OF INVENTION

Technical Problem

Nevertheless, depending on a subject an image of which a user intends to capture, a water level and an auxiliary line that are prepared in advance do not satisfy the demand of the user.

In view of the foregoing, the present disclosure proposes a display control apparatus, a display control method, and a computer program that are novel and improved, and can perform control of displaying an auxiliary line serving as aid for composition decision that satisfies the demand of the user.

Solution to Problem

According to the present disclosure, there is provided a display control apparatus including: a control unit configured to control a display mode on a screen of an auxiliary line serving as aid for composition decision at a time of image capturing, in accordance with the operation of a user that is performed on a screen.

In addition, according to the present disclosure, there is provided a display control method including: controlling a display mode on a screen of an auxiliary line serving as aid for composition decision at a time of image capturing, in accordance with an operation of a user that is performed on a screen.

In addition, according to the present disclosure, there is provided a computer program for causing a computer to execute: controlling a display mode on a screen of an auxiliary line serving as aid for composition decision at a time of image capturing, in accordance with an operation of a user that is performed on a screen.

Advantageous Effects of Invention

As described above, according to the present disclosure, a display control apparatus, a display control method, and a computer program that are novel and improved, and can perform control of displaying an auxiliary line serving as aid for composition decision that satisfies the demand of the user can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a flow chart illustrating an operation example of the image processing apparatus 100 according to the embodiment of the present disclosure.

FIG. 9 is an explanatory diagram illustrating an example of an image displayed on the display unit 110.

FIG. 21 is an explanatory diagram illustrating an example of a state in which four image processing apparatuses 100a to 100d are capturing images of the same subject.

MODE(S) FOR CARRYING OUT THE INVENTION

Figure 1:
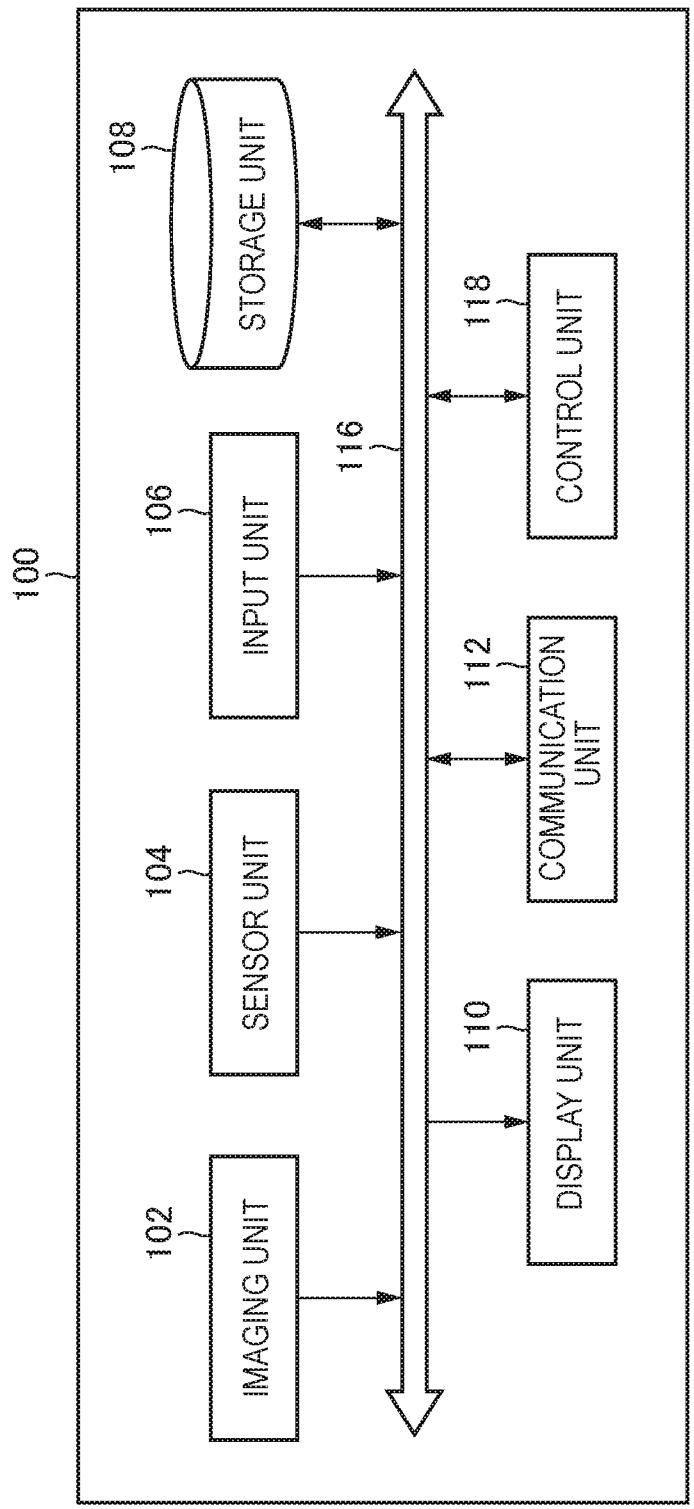
FIG. 1 is a block diagram illustrating a configuration example of an image processing apparatus 100 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order,

1. Embodiment of Present Disclosure
1.1. Background
1.2. Configuration Example
1.3. Operation Example
2. Conclusion

1. Embodiment of Present Disclosure

1.1. Background

First of all, a background of an embodiment of the present disclosure will be described.

As mentioned above, a user who captures an image of a landscape, a building, or the like as a subject using a digital still camera or a digital video camera desires to surely perform leveling, or desires to accurately set a composition. For satisfying such desires of the user, many of digital still cameras and digital video cameras have a function of displaying, on a viewfinder or a display, a water level and an auxiliary line serving as aid for a photographer to decide a composition at the time of image capturing.

In the case of performing image capturing using a general composition such as a centered composition or a rule of thirds composition, a water level and auxiliary lines that are prepared in advance by a digital still camera can serve as aid for the user to decide a composition at the time of image capturing. The water level presents to the user whether a digital camera is horizontal, and the auxiliary lines are drawn vertically and horizontally at equal intervals so as to serve as aid in performing image capturing using the rule of thirds composition, for example. By deciding a composition using the water level and the auxiliary lines that are displayed on a viewfinder or a display, it becomes possible for the user to perform image capturing using the aforementioned general compositions. Nevertheless, depending on a subject an image of which a user intends to capture, in some cases, the water level and the auxiliary lines that are prepared in advance by a digital still camera do not serve as aid for the user to decide a composition at the time of image capturing.

For example, the water level can present whether a digital still camera is horizontal, but in some cases, a horizontal digital still camera is not regarded as horizontal from the viewpoint of a composition. In addition, existing auxiliary lines are often displayed so as to vertically and horizontally divide a screen into three for performing image capturing using a general composition, but in some cases, it is difficult to decide a composition using the existing water level and auxiliary lines.

In addition, in a case where a subject such as a landscape of nature mainly includes curve lines, it is sometimes difficult to use the existing water level and auxiliary lines for the decision of a composition, because the existing water level and auxiliary lines are linearly displayed. Furthermore, in a case where a composition of a subject such as a building is desired to be strictly decided, the existing water level and the auxiliary lines sometimes do not serve as aid for composition decision.

Thus, the existing auxiliary lines and the water level have been unable to fully meet the demand of the user.

Thus, in view of the aforementioned background, the disclosing party of the present application earnestly studied a technology that can display an auxiliary line desired by the user, at the time of image capturing. As a result, the disclosing party of the present application has eventually devised a technology that can display an auxiliary line desired by the user, at the time of image capturing, in accordance with an operation of the user.

The background of the embodiment of the present disclosure has been described above. Subsequently, the embodiment of the present disclosure will be described in detail.

1.2. Configuration Example

First of all, a configuration example of an image processing apparatus 100 according to the embodiment of the present disclosure will be described. FIG. 1 is a block diagram illustrating a configuration example of the image processing apparatus 100 according to the embodiment of the present disclosure. The configuration example of the image processing apparatus 100 according to the embodiment of the present disclosure will be described below using FIG. 1.

As illustrated in FIG. 1, the image processing apparatus 100 according to the embodiment of the present disclosure includes an imaging unit 102, a sensor unit 104, an input unit 106, a storage unit 108, a display unit 110, a communication unit 112, a bus 116, and a control unit 118.

(1) Imaging Unit

The imaging unit 102 is a camera module that includes a zoom lens, a focusing lens, an image sensor, and the like, and captures an image. The imaging unit 102 captures an image of a real space using an image sensor such as a charge coupled device (CCD) or a complementary metal oxide semiconductor (CMOS), to generate a captured image. A series of captured images generated by the imaging unit 102 constitutes a video showing the real space. Note that the imaging unit 102 needs not be always a part of the image processing apparatus 100. For example, an imaging apparatus connected to the image processing apparatus 100 in a wired or wireless manner may be treated as the imaging unit 102. In addition, the zoom lens and the focusing lens in the imaging unit 102 may be provided so as to be detachable from the image processing apparatus 100.

(2) Sensor Unit

The sensor unit 104 can include various sensors such as a positioning sensor, an acceleration sensor, a gyro sensor, a geomagnetic sensor, an illuminance sensor, a temperature sensor, or a barometric sensor. A position, an attitude, or a motion of the image processing apparatus 100 that can be measured by the sensor unit 104 may be used for various purposes such as support for recognition of the position and the attitude of a camera, acquisition of data specialized for a geographical position, or recognition of an instruction from the user. Note that the sensor unit 104 may be omitted from the configuration of the image processing apparatus 100.

Specifically, examples of the positioning sensor can include a global navigation satellite system (GNSS) receiver, and/or a communication device, and the like. Examples of the GNSS can include the Global Positioning System (GPS), the Global Navigation Satellite System (GLONASS), the BeiDou Navigation Satellite System (BDS), a Quasi-Zenith Satellites System (QZSS), the Galileo, and the like. In addition, examples of the positioning sensor can include sensors that detect positions using technologies such as a wireless local area network (LAN), Multi-Input Multi-Output (AMMO), cellular communication (e.g. position detection that uses a portable base station, femtocell), Near Field Communication (e.g., Bluetooth Low Energy (BLE), Bluetooth (registered trademark)), or the like.

(3) Input Unit

The input unit 106 is an input device used by the user for operating the image processing apparatus 100 or inputting information to the image processing apparatus 100. For example, the input unit 106 may include a touch sensor that detects a touch performed by the user on a screen of the display unit 110. The touch sensor can desirably detect touches at two or more points, but is not limited to a touch sensor that can detect touches at two or more points. In place of this (or in addition to this), the input unit 106 may include a pointing device such as a mouse or a touch pad. Furthermore, the input unit 106 may include an input device of another type, such as a keyboard, a keypad, a button, or a switch.

(4) Storage Unit

The storage unit 108 includes a storage medium such as a semiconductor memory or a hard disc, and stores programs and data for processing performed by the image processing apparatus 100. For example, data stored by the storage unit 108 can include captured image data, sensor data, and auxiliary line data, which will be described later. Note that a part of the programs and data described in this specification may be acquired from an external data source, data server, network storage, an external memory, or the like), without being stored in the storage unit 108.

(5) Display Unit

The display unit 110 is a display module including a display such as a liquid crystal display (LCD) or an organic light-emitting diode (OLED). For example, the display unit 110 is used for displaying an output image generated by the image processing apparatus 100. Note that the display unit 110 also needs not be always a part of the image processing apparatus 100. For example, a display device connected to the image processing apparatus 100 in a wired or wireless manner may be treated as the display unit 110.

For example, a through image, that is to say, a subject image sequentially captured by the imaging unit 102 is displayed on the display unit 110 by the control of the control unit 118. In addition, an auxiliary line is drawn on the display unit 110 by the control of the control unit 118. The auxiliary line displayed on the display unit 110 can be superimposed on the above-described through image, but needs not be superimposed on the through image.

(6) Communication Unit

The communication unit 112 is a communication interface that mediates communication performed by the image processing apparatus 100 with another apparatus. The communication unit 112 supports an arbitrary wireless communication protocol or wired communication protocol, and establishes communication connection with another apparatus.

(7) Bus

The bus 116 connects the imaging unit 102, the sensor unit 104, the input unit 106, the storage unit 108, the display unit 110, the communication unit 112, and the control unit 118 to one another.

(8) Control Unit

The control unit 118 corresponds to a processor such as a central processing unit (CPU) or a digital signal processor (DSP). By executing programs stored in the storage unit 108 or another storage medium, the control unit 118 operates various functions of the image processing apparatus 100, which will be described later.

In the present embodiment, the control unit 118 causes the display unit 110 to display an auxiliary line serving as aid for the user to decide a composition at the time of image capturing, in accordance with an input operation of the user that is performed on the input unit 106. By the control unit 118 causing the display unit 110 to display an auxiliary line serving as aid for the user to decide a composition at the time of image capturing, in accordance with an input operation of the user that is performed on the input unit 106, the image processing apparatus 100 can display an auxiliary line desired by the user, on the display unit 110.

The configuration example of the image processing apparatus 100 according to the embodiment of the present disclosure has been described above using FIG. 1. Subsequently, an operation example of the image processing apparatus 100 according to the embodiment of the present disclosure will be described.

1.3. Operation Example

Figure 2:
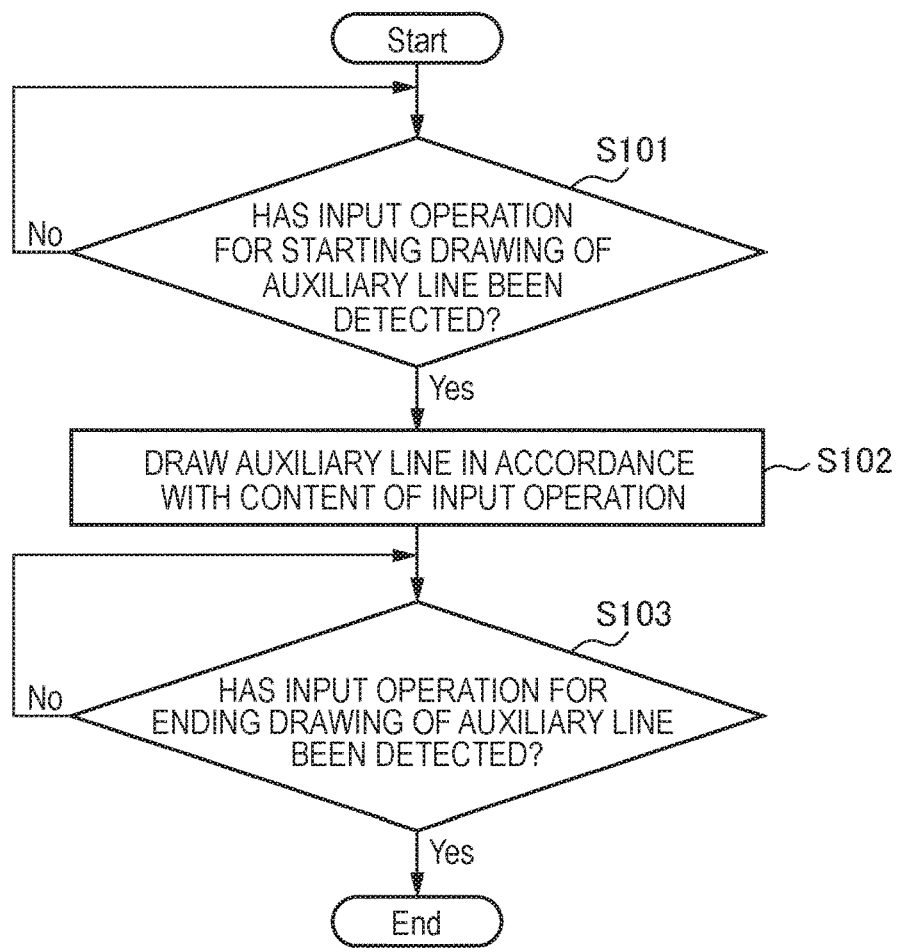
FIG. 2 is a flow chart illustrating an operation example of the image processing apparatus 100 according to the embodiment of the present disclosure.

FIG. 2 is a flow chart illustrating an operation example of the image processing apparatus 100 according to the embodiment of the present disclosure. FIG. 2 illustrates an operation example of the image processing apparatus 100 in displaying an auxiliary line serving as aid for the user to decide a composition at the time of image capturing, in accordance with an input operation of the user. The operation example of the image processing apparatus 100 according to the embodiment of the present disclosure will be described below using FIG. 2.

The image processing apparatus 100 waits until an input operation for starting the drawing of an auxiliary line that is performed by the user using the input unit 106 is detected (step S101). The control unit 118 performs the detection of the input operation.

For example, from a setting screen of the image processing apparatus 100 that is displayed on the display unit 110, the image processing apparatus 100 may transition to a screen for drawing an auxiliary line on the display unit 110, in accordance with a predetermined input operation of the user that is performed using the input unit 106, and accept an input operation for drawing an auxiliary line. In addition, the image processing apparatus 100 may recognize a predetermined gesture operation of the user that is performed on a touch panel provided on the display unit 110, and transition to the screen for drawing an auxiliary line on the display unit 110. After fixing the image processing apparatus 100 using a tripod stand or the like, the user strongly demands to avoid moving the fixed image processing apparatus 100. Thus, by transitioning to the screen for drawing an auxiliary line on the display unit 110, by the predetermined gesture operation of the user that is performed on the touch panel provided on the display unit 110, the image processing apparatus 100 can satisfy the above-described demand of the user.

While the screen for drawing an auxiliary line on the display unit 110 is being displayed on the display unit 110, the image processing apparatus 100 may continue to display, on the display unit 110, a subject image (through image) sequentially captured by the imaging unit 102. By drawing an auxiliary line on the display unit 110 in accordance with a predetermined input operation of the user that is performed using the input unit 106, in a state in which the through image is continuously displayed on the display unit 110, the image processing apparatus 100 can cause the user to arbitrarily draw an auxiliary line more efficiently.

While the screen for drawing an auxiliary line on the display unit 110 is being displayed on the display unit 110, the image processing apparatus 100 may read out one image from among images saved in the storage unit 108, and continue to display the read-out image on the display unit 110. By drawing an auxiliary line on the display unit 110 in accordance with a predetermined input operation of the user that is performed using the input unit 106, in a state in which the image read out from the storage unit 108 is continuously displayed on the display unit 110, the image processing apparatus 100 can cause the user to arbitrarily draw an auxiliary line more efficiently.

The input operation for starting the drawing of an auxiliary line is not limited to a specific operation. For example, as mentioned later, when a finger of the user touches or approaches a rim portion of the display unit 110, the image processing apparatus 100 may start to draw an auxiliary line on the display unit 110. In addition, for example, as mentioned later, in a state in which an auxiliary line is already drawn on the display unit 110, when a finger of the user touches or approaches the auxiliary line, the image processing apparatus 100 may start to draw (edit or move) the auxiliary line on the display unit 110.

When the input operation for starting the drawing of an auxiliary line that is performed by the user using the input unit 106 is detected (step S101, Yes), the image processing apparatus 100 subsequently draws an auxiliary line on the display unit 110 in accordance with an input operation performed by the user using the input unit 106 (step S102). The control unit 118 performs the drawing of the auxiliary line onto the display unit 110 that is performed in accordance with the input operation.

Then, the image processing apparatus 100 waits until an input operation for ending the drawing of an auxiliary line that is performed by the user using the input unit 106 is detected (step S103). When the input operation for ending the drawing of an auxiliary line that is performed by the user using the input unit 106 is detected (step S103, Yes), the image processing apparatus 100 ends the drawing of the auxiliary line that is performed in accordance with the input operation of the user.

The operation example of the image processing apparatus 100 according to the embodiment of the present disclosure has been described above using FIG. 2. Subsequently, a specific example of the drawing of an auxiliary line that is performed by the image processing apparatus 100 will be described in detail.

Figure 3:
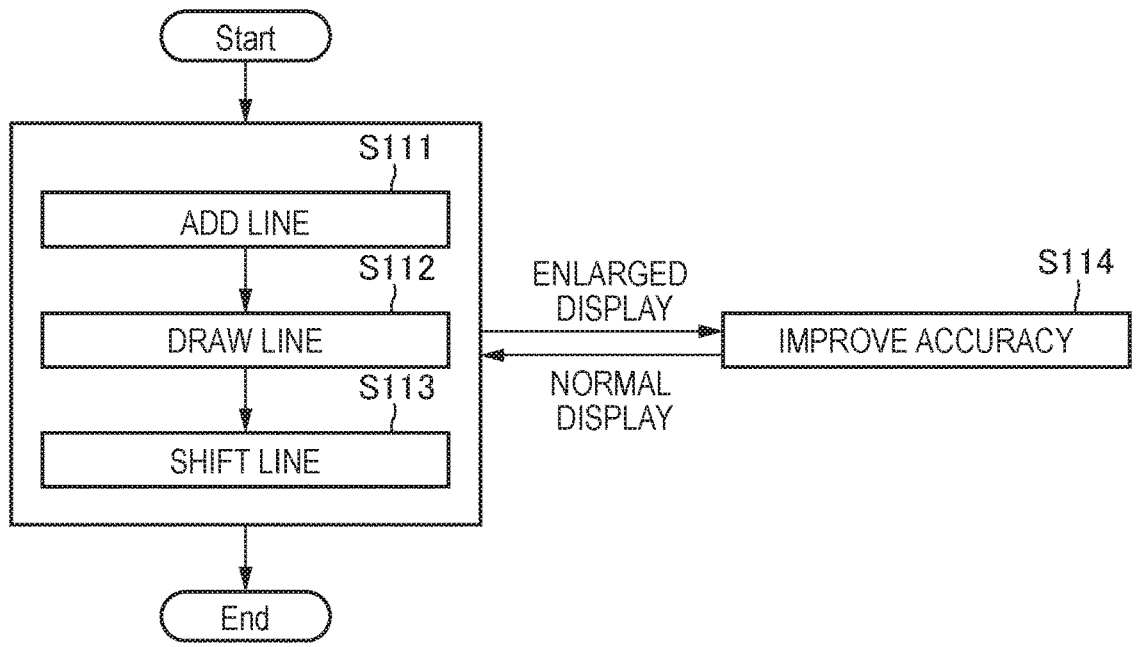
FIG. 3 is a flow chart illustrating an operation example of the image processing apparatus 100 according to the embodiment of the present disclosure.

FIG. 3 is a flow chart illustrating an operation example of the image processing apparatus 100 according to the embodiment of the present disclosure. FIG. 3 illustrates an operation example of the image processing apparatus 100 in drawing, on the display unit 110, an auxiliary line serving as aid for the user to decide a composition at the time of image capturing, in accordance with an input operation of the user. The operation example of the image processing apparatus 100 according to the embodiment of the present disclosure will be described below using FIG. 3.

When drawing an auxiliary line on the display unit 110, the image processing apparatus 100 (the control unit 118) performs addition processing of an auxiliary line (step S111), drawing processing of an auxiliary line (step S112), and shift processing of the auxiliary line (step S113), in accordance with an input operation of the user. In addition, the image processing apparatus 100 performs accuracy improvement processing of the drawn auxiliary line in accordance with an input operation of the user (step S114). Examples of an input operation for accuracy improvement of an auxiliary line include an operation for enlarging or reducing an image displayed on the display unit 110. Examples of the operation of enlarging the image can include a pinch-out operation on the display unit 110, and an operation for enlarging that is provided in the input unit 106, and examples of the operation of reducing the image can include a pinch-in operation on the display unit 110, and an operation for reducing that is provided in the input unit 106.

Figure 4:
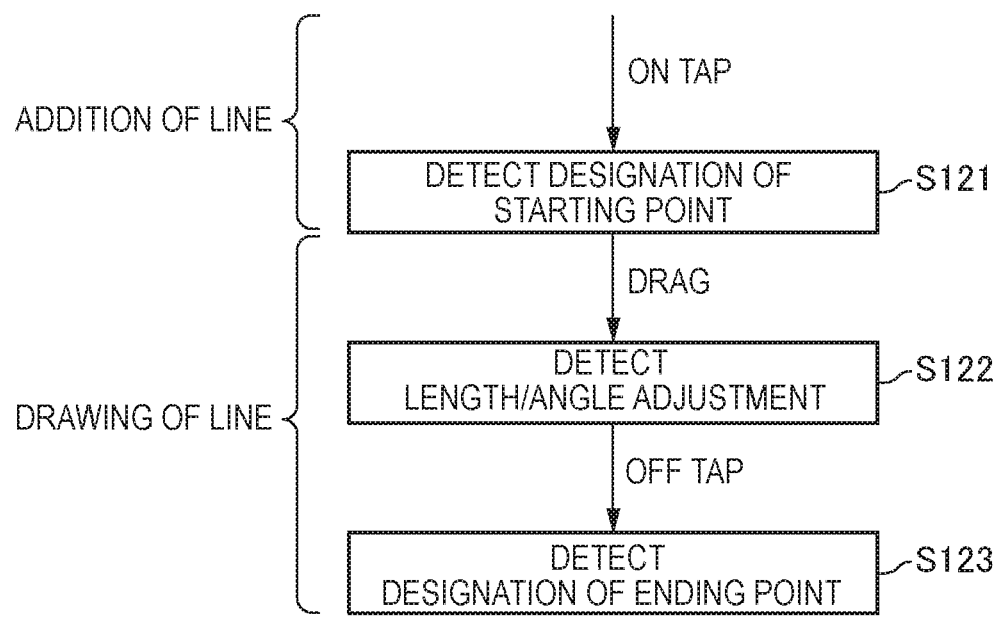
FIG. 4 is a flow chart illustrating an operation example of the image processing apparatus 100 according to the embodiment of the present disclosure.

Examples of the addition processing of an auxiliary line to the display unit 110 (step S111) and the drawing processing of an auxiliary line on the display unit 110 (step S112) will be described. FIG. 4 is a flow chart illustrating an operation example of the image processing apparatus 100 according to the embodiment of the present disclosure. FIG. 4 illustrates an operation example of the image processing apparatus 100 in performing the addition processing of an auxiliary line and the drawing processing of an auxiliary line.

When the image processing apparatus 100 detects that the user has performed a predetermined operation of performing the designation of a starting point of an auxiliary line (e.g., touching or approaching of a finger or the like to the display unit 110) (step S121), the image processing apparatus 100 sets a starting point of an auxiliary line that the user intends to set, on the display unit 110.

Figure 5:
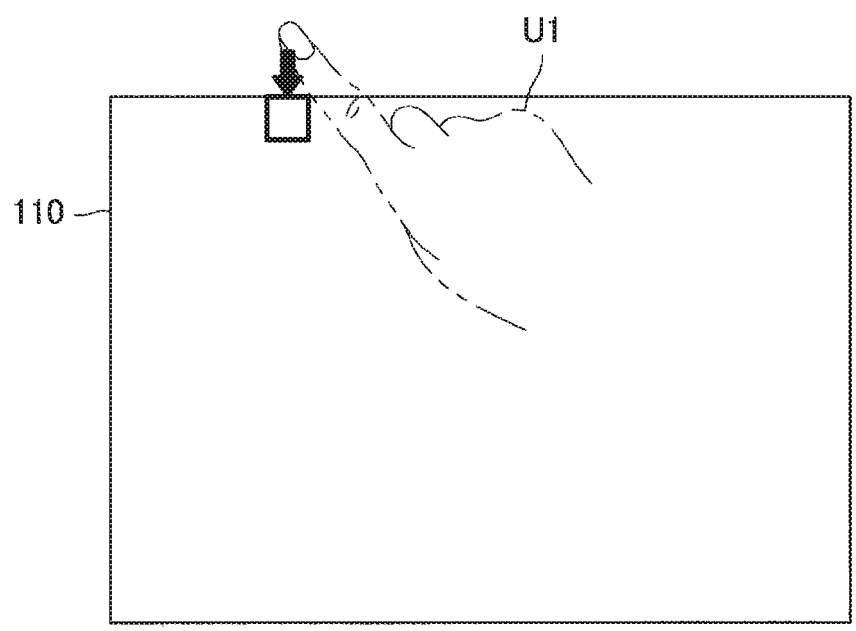
FIG. 5 is an explanatory diagram illustrating an example of an image displayed on a display unit 110.

FIG. 5 is an explanatory diagram illustrating a state in which the user performs an operation of designating a starting point of an auxiliary line. FIG. 5 is an explanatory diagram illustrating a state in which a finger of a hand U1 of the user touches one point on an upper side of the display unit 110 as a predetermined operation of performing the designation of a starting point of an auxiliary line. When the control unit 118 detects that the finger of the hand U1 of the user has touched one point on the upper side of the display unit 110, the control unit 118 sets the position touched by the finger of the hand U1 of the user, as a starting point of an auxiliary line.

Subsequently, when the image processing apparatus 100 detects that the user has performed a predetermined operation of performing the adjustment of a length and an angle of the auxiliary line (e.g., drag operation from the position of the starting point of the auxiliary line that is performed onto the display unit 110) (step S122), the image processing apparatus 100 sets a length and an angle of the auxiliary line that the user intends to set, on the display unit 110.

Figure 6:
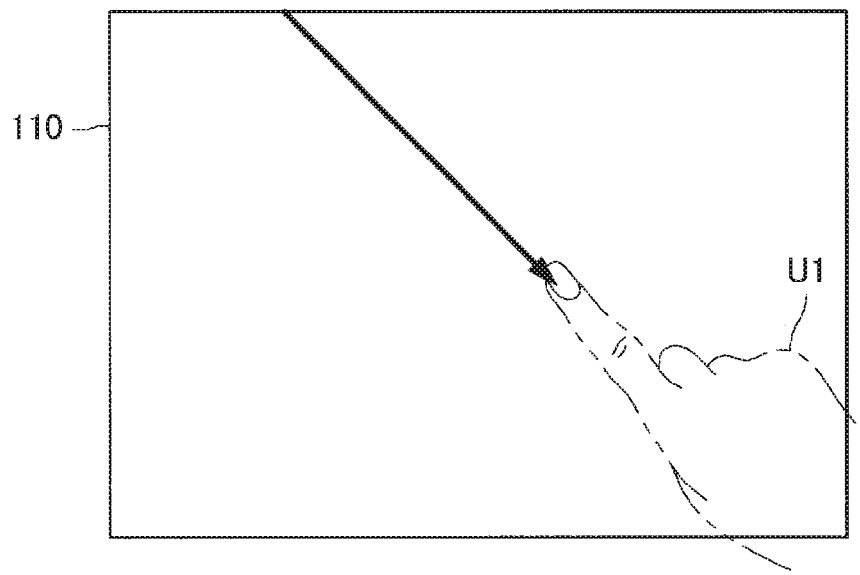
FIG. 6 is an explanatory diagram illustrating an example of an image displayed on the display unit 110.

FIG. 6 is an explanatory diagram illustrating a state in which the user performs an operation of adjusting a length and an angle of an auxiliary line. FIG. 6 is an explanatory diagram of a state in which a drag operation of the finger of the hand U1 of the user from the position illustrated in FIG. 5 is being performed as an operation of adjusting a length and an angle of an auxiliary line. When the control unit 118 detects that the user is performing a drag operation, the control unit 118 linearly draws an auxiliary line on the display unit 110 from the position of the starting point, in accordance with the drag operation.

Subsequently, when the image processing apparatus 100 detects that the user has performed a predetermined operation of performing the designation of an ending point of the auxiliary line (e.g., release of touching or approaching of a finger or the like to the display unit 110) (step S123), the image processing apparatus 100 sets an ending point of the auxiliary line that the user intends to set, on the display unit 110.

Figure 7:
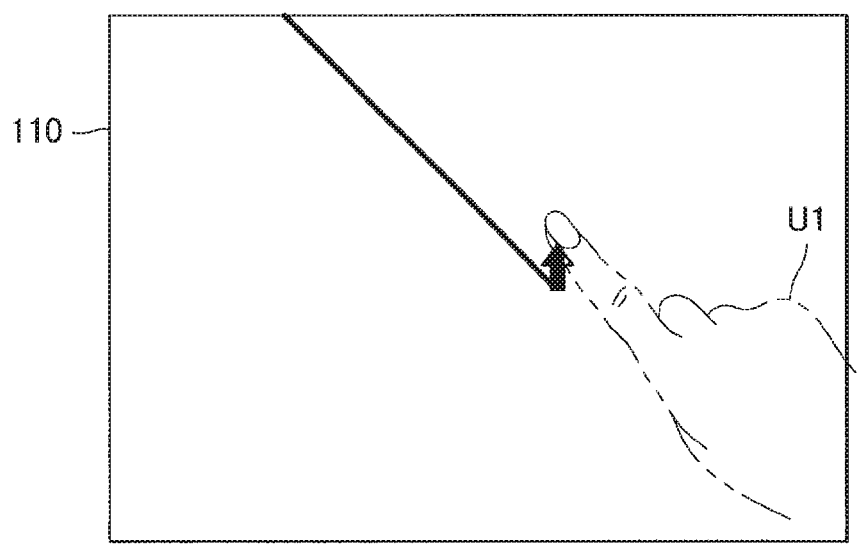
FIG. 7 is an explanatory diagram illustrating an example of an image displayed on the display unit 110.

FIG. 7 is an explanatory diagram illustrating a state in which the user performs an operation of designating an ending point of the auxiliary line. FIG. 7 is an explanatory diagram illustrating a state in which the finger of the hand U1 of the user gets separated from the display unit 110 as a predetermined operation of performing the designation of an ending point of the auxiliary line. When the control unit 118 detects that the finger of the hand U1 of the user has got separated from the display unit 110, the control unit 118 sets a position at Which the finger of the hand U1 of the user has got separated from the display unit 110, as an ending point of the auxiliary line.

By executing a series of operations mentioned above, the image processing apparatus 100 can draw an auxiliary line on the display unit 110 in accordance with an operation of the user. It should be appreciated that the image processing apparatus 100 can draw a plurality of auxiliary lines on the display unit 110 in accordance with an operation of the user. Nevertheless, if the number of auxiliary lines is increased too much, the auxiliary lines are considered to return back to interfere composition decision in some cases. The image processing apparatus 100 therefore may set an upper limit on the number of auxiliary lines that can be drawn in accordance with an operation of the user. By the image processing apparatus 100 drawing an auxiliary line on the display unit 110 in accordance with an operation of the user, the image processing apparatus 100 can display, on the display unit 110, an auxiliary line desired by the user at the time of shooting. Note that FIGS. 5 to 7 illustrate states in which only an auxiliary line drawn in accordance with an operation of the user is displayed on the display unit 110, but the image processing apparatus 100 may continue to display a through image on the display unit 110 when drawing the auxiliary line on the display unit 110 in accordance with an operation of the user, as mentioned above.

In addition, in the examples illustrated in FIGS. 5 to 7, the auxiliary line is arbitrarily drawn on the display unit 110 by causing the user to designate the starting point of the auxiliary line, and to drag the finger to the ending point of the auxiliary line. Nevertheless, the present disclosure is not limited to this example. The image processing apparatus 100 may draw an auxiliary line on the display unit 110 by causing the user to sequentially designate two points of a starting point and an ending point of the auxiliary line.

The image processing apparatus 100 can shift and deform an auxiliary line once drawn on the display unit 110, in accordance with an operation of the user. Subsequently, an example of the shift processing of the auxiliary line on the display unit 110 (step S113) will be describe& FIG. 8 is a flow chart illustrating an operation example of the image processing apparatus 100 according to the embodiment of the present disclosure. FIG. 8 illustrates an operation example of the image processing apparatus 100 in performing parallel shift processing of an auxiliary line.

When the image processing apparatus 100 detects that the user has performed a predetermined operation of performing the designation of a parallel shift target auxiliary line (e.g., touching or approaching of a finger or the like to the display unit 110) (step S131), the image processing apparatus 100 decides an auxiliary line that the user intends to shift in parallel.

FIG. 9 is an explanatory diagram illustrating a state in which the user performs an operation of designating a parallel shift target auxiliary line. FIG. 9 is an explanatory diagram illustrating a state in which the finger of the hand U1 of the user touches one point on an auxiliary line displayed on the display unit 110, as a predetermined operation of performing the designation of a parallel shift target auxiliary line. When the control unit 118 detects that the finger of the hand U1 of the user has touched one point on an auxiliary line displayed on the display unit 110, the control unit 118 sets the auxiliary line existing at the position touched by the finger of the hand U1 of the user, as a parallel shift target.

Subsequently, when the image processing apparatus 100 detects that the user has performed a predetermined operation of performing a parallel shift of an auxiliary line (e.g., drag operation from the touched position of the auxiliary line that is performed on the display unit 110) (step S132), the image processing apparatus 100 shifts in parallel the auxiliary line drawn on the display unit 110, in accordance with an operation of the user.

Figure 10:
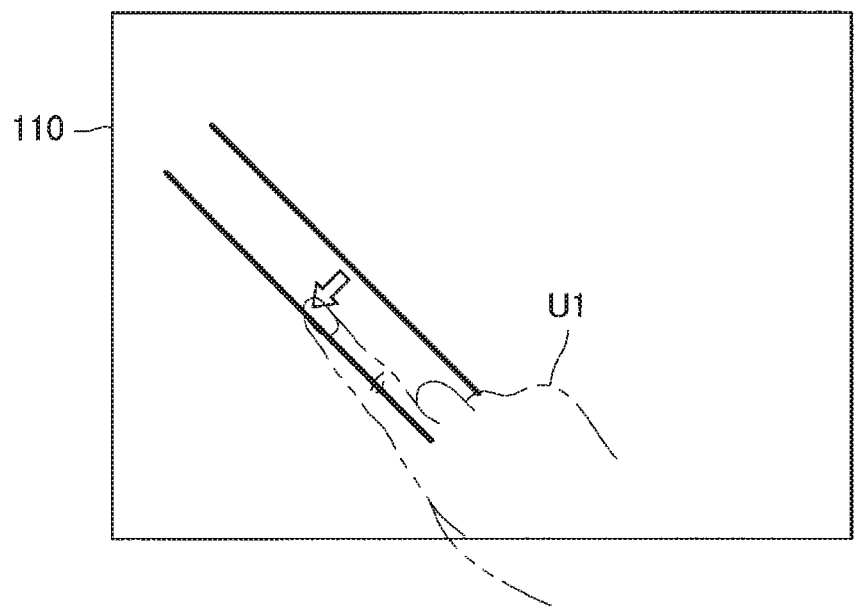
FIG. 10 is an explanatory diagram illustrating an example of an image displayed on the display unit 110.

FIG. 10 is an explanatory diagram illustrating a state in which the user performs an operation of shifting an auxiliary line in parallel. FIG. 10 is an explanatory diagram of a state in which a drag operation of the finger of the hand U1 of the user from the position illustrated in FIG. 9 is being performed as an operation of shifting an auxiliary line in parallel. When the control unit 118 detects that the user is performing a drag operation, the control unit 118 shifts in parallel the auxiliary line drawn on the display unit 110, in accordance with the drag operation.

Subsequently, when the image processing apparatus 100 detects that the user has performed a predetermined operation of ending the parallel shift of the auxiliary line (e.g., release of touching or approaching of a finger or the like to the display unit 110) (step S133), the image processing apparatus 100 ends the parallel shift of the auxiliary line drawn on the display unit 110.

Figure 11:
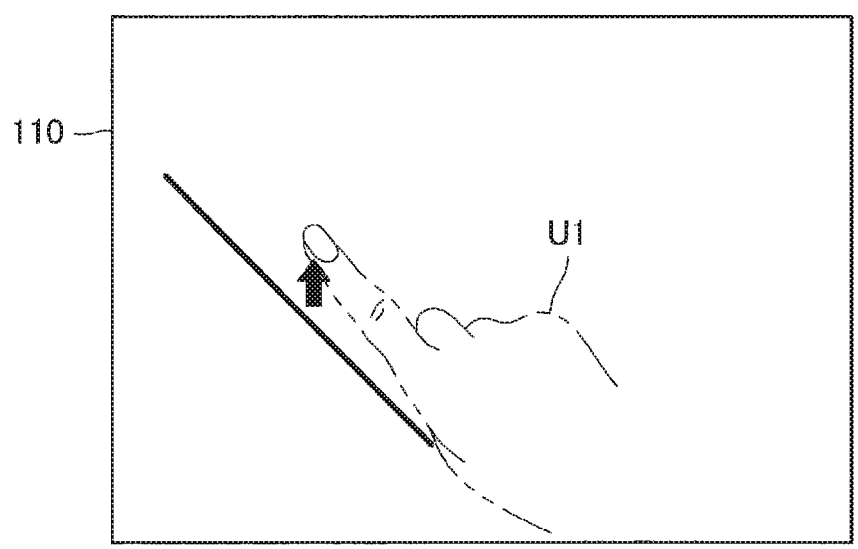
FIG. 11 is an explanatory diagram illustrating an example of an image displayed on the display unit 110.

FIG. 11 is an explanatory diagram illustrating a state in which the user performs an operation of ending the parallel shift of the auxiliary line. FIG. 11 is an explanatory diagram illustrating a state in which the finger of the hand UT of the user gets separated from the display unit 110 as a predetermined operation of ending the parallel shift of the auxiliary line. When the control unit 118 detects that the finger of the hand U1 of the user has got separated from the display unit 110, the control unit 118 ends the parallel shift of the auxiliary line drawn on the display unit 110.

Note that FIGS. 9 to 11 illustrate states in which only an auxiliary line drawn in accordance with an operation of the user is displayed on the display unit 110, but the image processing apparatus 100 may continue to display a through image on the display unit 110 when drawing the auxiliary line on the display unit 110 in accordance with an operation of the user, as mentioned above.

Figure 12:
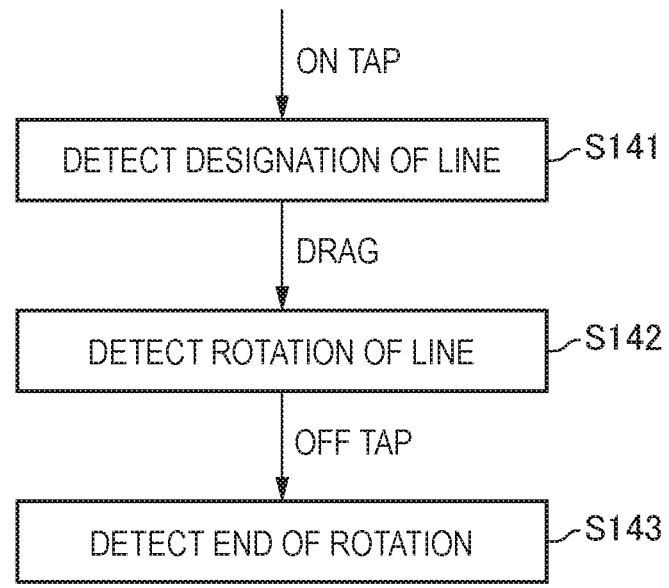
FIG. 12 is a flow chart illustrating an operation example of the image processing apparatus 100 according to the embodiment of the present disclosure.

FIG. 12 is a flow chart illustrating an operation example of the image processing apparatus 100 according to the embodiment of the present disclosure. FIG. 12 illustrates an operation example of the image processing apparatus 100 in performing rotational shift processing of an auxiliary line.

Figure 13:
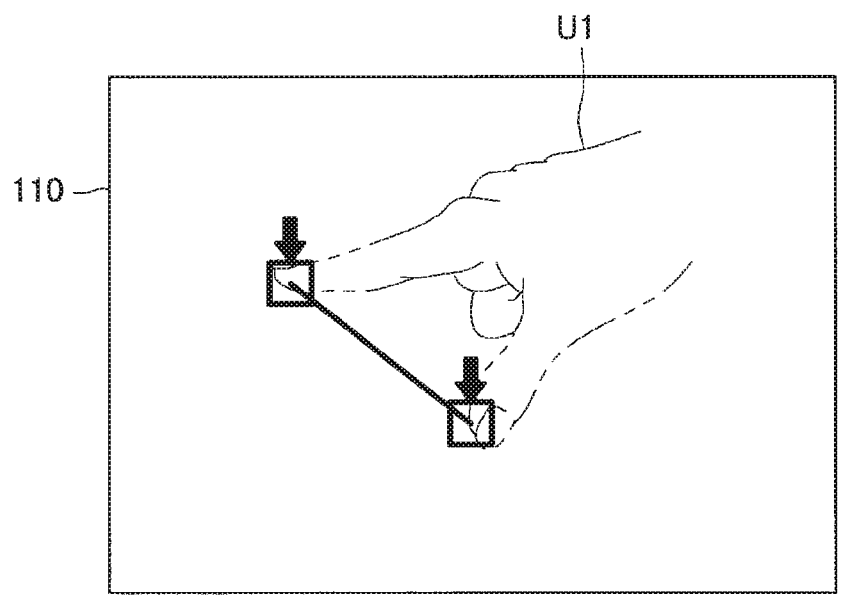
FIG. 13 is an explanatory diagram illustrating an example of an image displayed on the display unit 110.

When the image processing apparatus 100 detects that the user has performed a predetermined operation of performing the designation of a rotational shift target auxiliary line (e.g., touching or approaching of a finger or the like to the display unit 110) (step S141), the image processing apparatus 100 decides an auxiliary line that the user intends to shift. FIG. 13 is an explanatory diagram illustrating a state in which the user performs an operation of designating a shift target auxiliary line. FIG. 13 is an explanatory diagram illustrating a state in which two fingers of the hand U1 of the user respectively touch both ends of an auxiliary line displayed on the display unit 110, as a predetermined operation of performing the designation of a shift target auxiliary line.

When the control unit 118 detects that the fingers of the hand U1 of the user have touched both ends of an auxiliary line displayed on the display unit 110, the control unit 118 sets the auxiliary line existing at the positions touched by the fingers of the hand U1 of the user, as a rotational shift target.

Figure 14:
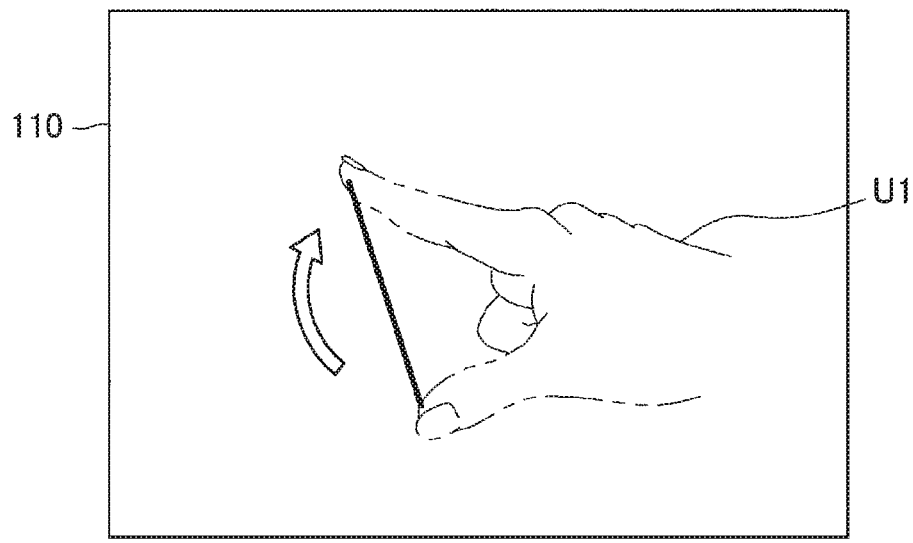
FIG. 14 is an explanatory diagram illustrating an example of an image displayed on the display unit 110.

Subsequently, when the image processing apparatus 100 detects that the user has performed a predetermined operation of performing a rotational shift of an auxiliary line (e.g., drag operation from the touched positions of the auxiliary line that is performed on the display unit 110) (step S142), the image processing apparatus 100 rotationally shifts the auxiliary line drawn on the display unit 110, in accordance with an operation of the user. FIG. 14 is an explanatory diagram illustrating a state in which the user performs an operation of rotationally shifting an auxiliary line. FIG. 14 is an explanatory diagram of a state in which a drag operation of the fingers of the hand U1 of the user from the positions illustrated in FIG. 13 is being performed as an operation of rotationally shifting an auxiliary line. When the control unit 118 detects that the user is performing a drag operation, the control unit 118 rotationally shifts the auxiliary line drawn on the display unit 110, in accordance with the drag operation.

Figure 15:
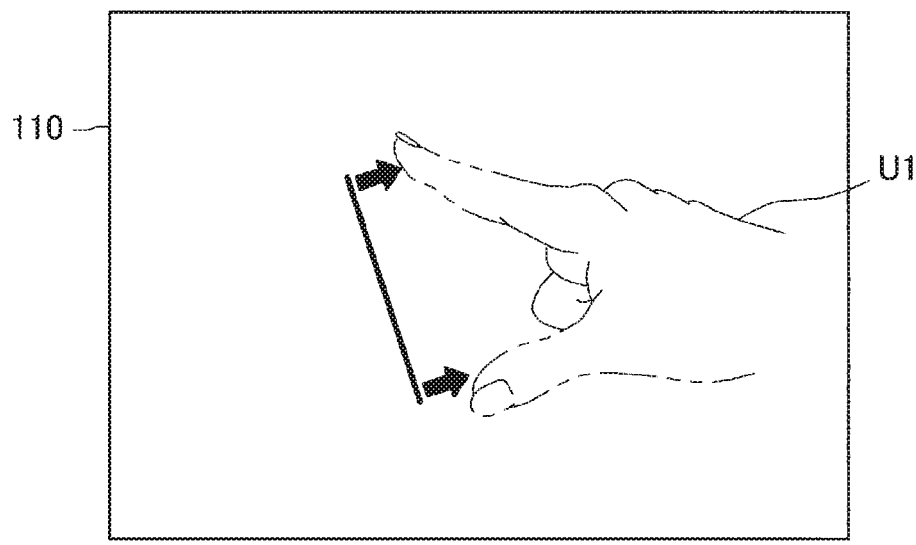
FIG. 15 is an explanatory diagram illustrating an example of an image displayed on the display unit 110.

Subsequently, when the image processing apparatus 100 detects that the user has performed a predetermined operation of ending the rotational shift of the auxiliary line (e.g., release of touching or approaching of a finger or the like to the display unit 110) (step S143), the image processing apparatus 100 ends the rotational shift of the auxiliary line drawn on the display unit 110. FIG. 15 is an explanatory diagram illustrating a state in which the user performs an operation of ending the shift of an auxiliary line. FIG. 15 is an explanatory diagram illustrating a state in which both two fingers of the hand U1 of the user get separated from the display unit 110 as a predetermined operation of ending the rotational shift of an auxiliary line. When the control unit 118 detects that the both two fingers of the hand U1 of the user have got separated from the display unit 110, the control unit 118 ends the rotational shift of the auxiliary line drawn on the display unit 110. Note that FIGS. 13 to 15 illustrate states in which only an auxiliary line drawn in accordance with an operation of the user is displayed on the display unit 110, but the image processing apparatus 100 may continue to display a through image on the display unit 110 when drawing the auxiliary line on the display unit 110 in accordance with an operation of the user, as mentioned above.

An operation of the rotational shift of an auxiliary line that is performed by the user is not limited to this example. For example, when the image processing apparatus 100 detects that, in a state in which the user touches one end of an auxiliary line using a finger, the user has performed a drag operation while touching an arbitrary location on the auxiliary line using another finger, the image processing apparatus 100 may rotationally shift the auxiliary line drawn on the display unit 110, on the basis of the operation.

Figure 16:
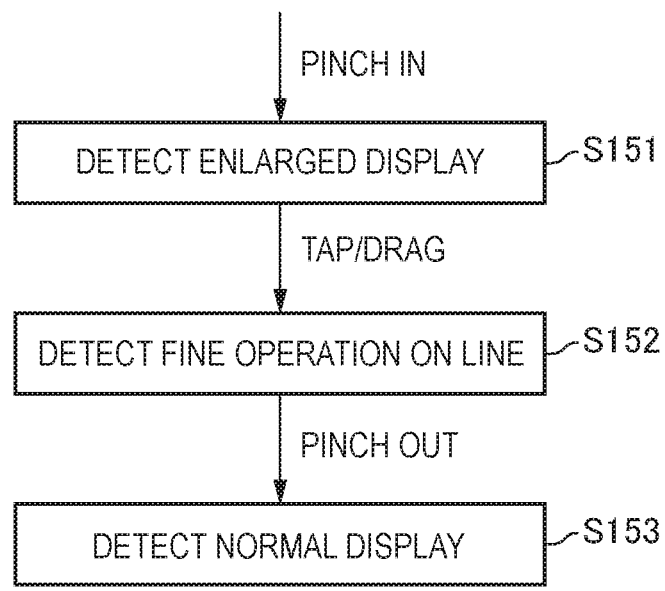
FIG. 16 is a flow chart illustrating an operation example of the image processing apparatus 100 according to the embodiment of the present disclosure.

Next, an example of the accuracy improvement processing of an auxiliary line drawn on the display unit 110 (step S114) will be described. FIG. 16 is a flow chart illustrating an operation example of the image processing apparatus 100 according to the embodiment of the present disclosure. FIG. 16 illustrates an operation example of the image processing apparatus 100 in performing the accuracy improvement processing of an auxiliary line drawn on the display unit 110.

When the image processing apparatus 100 detects that the user has performed a predetermined operation of enlarging an image on the display unit 110 (e.g., pinch-out operation on the display unit 110) for performing accuracy improvement of an auxiliary line (step S151), the image processing apparatus 100 performs processing of enlarging an image on the display unit 110.

Figure 17:
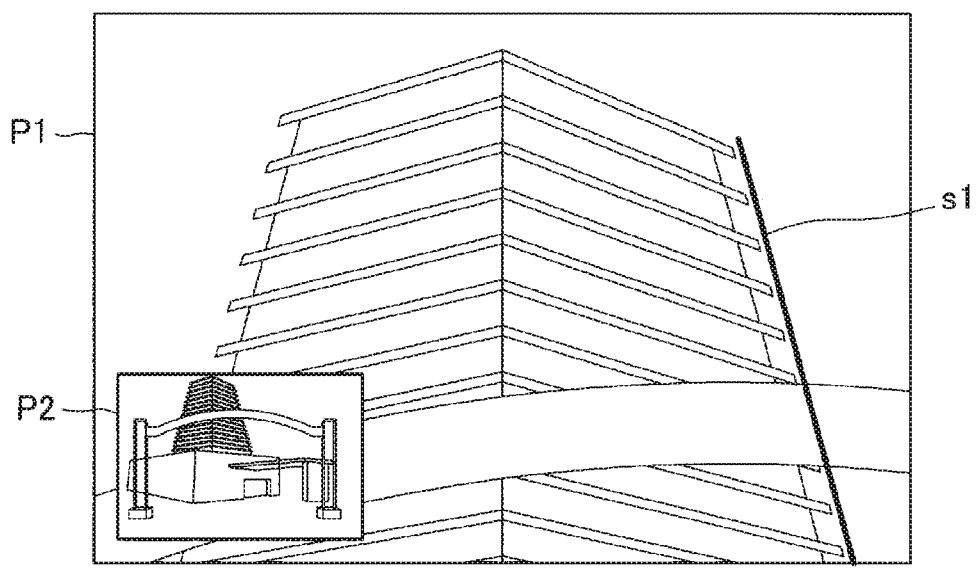
FIG. 17 is an explanatory diagram illustrating an example of an image displayed on the display unit 110.

FIG. 17 is an explanatory diagram illustrating a state caused after enlargement processing is performed on the display unit 110. FIG. 17 illustrates a state in which an original image p1 obtained before enlargement, and an enlarged image p2 on which an auxiliary line s1 is superimposed are displayed on the display unit 110. Note that the image p1 may be an image (a through image) being captured by the imaging unit 102.

Subsequently, when the image processing apparatus 100 detects that the user has performed a predetermined operation of performing accuracy improvement of an auxiliary line (e.g., drag operation from a touched position of the auxiliary line that is performed on the display unit 110) (step S152), the image processing apparatus 100 shifts in parallel the auxiliary line drawn on the display unit 110, in accordance with an operation of the user.

Figure 18:
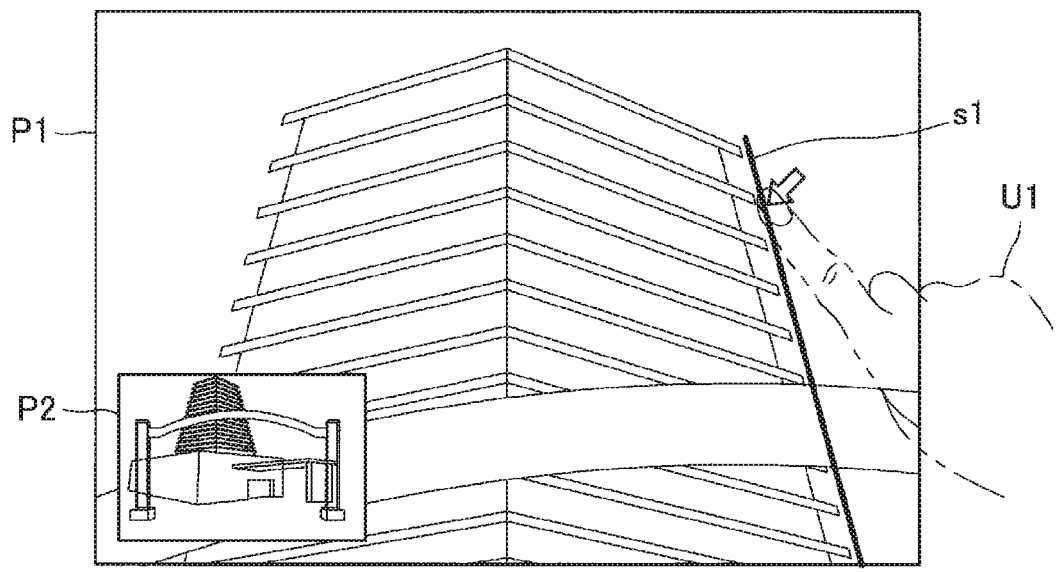
FIG. 18 is an explanatory diagram illustrating an example of an image displayed on the display unit 110.

FIG. 18 is an explanatory diagram illustrating a state in which the user performs an operation of shifting the auxiliary line s1 in parallel. FIG. 18 is an explanatory diagram of a state in which a drag operation of the finger of the hand U1 of the user from the position illustrated in FIG. 17 is being performed as an operation of shifting the auxiliary line s1 in parallel. When the control unit 118 detects that the user is performing a drag operation, the control unit 118 shifts in parallel the auxiliary line s1 drawn on the display unit 110, in accordance with the drag operation. It should be appreciated that an operation performed by a predetermined operation of performing accuracy improvement of an auxiliary line is not limited to the parallel shift of the auxiliary line s1, and the rotational shift of the auxiliary line s1 may be performed.

Figure 19:
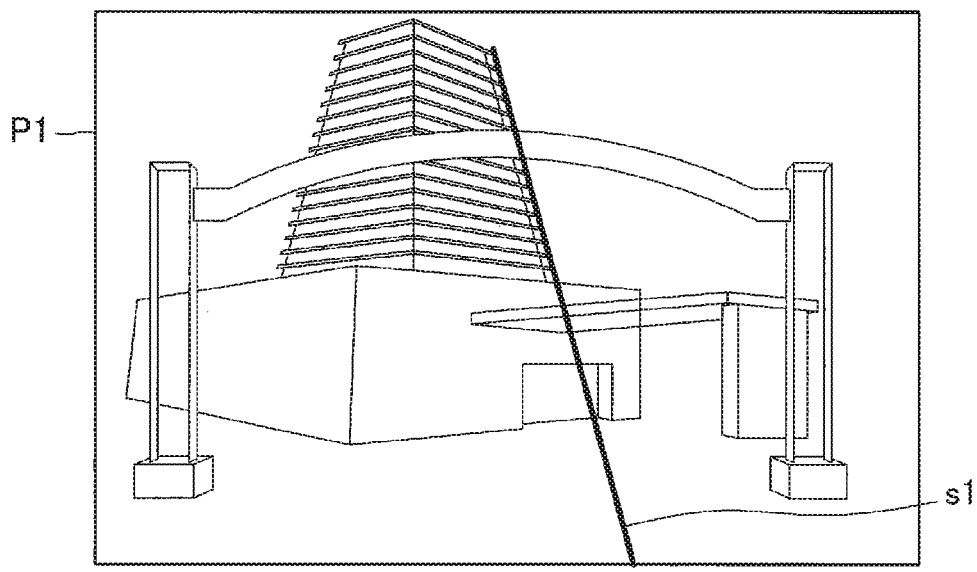
FIG. 19 is an explanatory diagram illustrating an example of an image displayed on the display unit 110.

When the image processing apparatus 100 detects that the user has performed a predetermined operation of reducing an image on the display unit 110 (returning to the original display) (e.g., pinch-in operation on the display unit 110) for ending the accuracy improvement of the auxiliary line (step S153), the image processing apparatus 100 performs processing of reducing the image on the display unit 110 to return to the original display. FIG. 19 is an explanatory diagram illustrating a state caused after reduction processing is performed on the display unit 110. FIG. 19 illustrates a state in which the original image p1 on which the auxiliary line s1 is superimposed is displayed on the display unit 110.

By thus accepting the enlargement processing of an image being displayed on the display unit 110, the image processing apparatus 100 can cause the user to improve the accuracy of an auxiliary line.

As described above, the image processing apparatus 100 can display, on the display unit 110, an auxiliary line serving as aid for the user to perform image capturing, in accordance with an operation of the user. By superimposing an auxiliary line on a through image when displaying the auxiliary line on the display unit 110 in accordance with an operation of the user, it becomes possible for the image processing apparatus 100 to effectively aid the user to decide a composition.

In the aforementioned description, an example in which the user arbitrarily draws an auxiliary line using a finger as an example of an operation member has been illustrated. Nevertheless, the present disclosure is not limited to this example. The image processing apparatus 100 may accept the drawing of an auxiliary line that is performed using a device such as a stylus, instead of a part of a body of the user.

In the aforementioned example, the image processing apparatus 100 draws an auxiliary line on the display unit 110 in accordance with an operation of the user. Nevertheless, the present disclosure is not limited to this example. For example, image processing may be performed on an image being captured by the imaging unit 102, and an auxiliary line may be displayed on the display unit 110 in accordance with a result of the image processing.

For example, in a case where a building is included in an image being captured by the imaging unit 102, and an auxiliary line is desired to be aligned to the boundary of the building, the image processing apparatus 100 can draw an auxiliary line on the display unit 110 in accordance with an operation of the user. Alternatively, the image processing apparatus 100 may detect an edge of the building by performing image processing, and draw an auxiliary line at the position of the edge.

Figure 20:
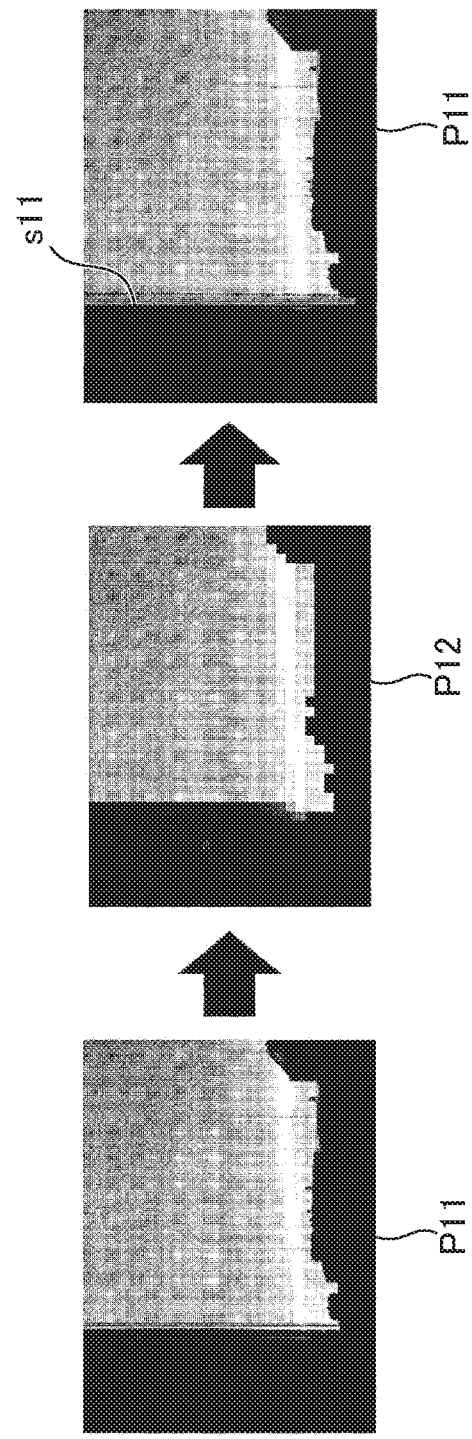
FIG. 20 is an explanatory diagram illustrating an example of drawing processing of an auxiliary line that is performed by the image processing apparatus 100.

FIG. 20 is an explanatory diagram illustrating an example of drawing processing of an auxiliary line that is performed by the image processing apparatus 100. FIG. 20 illustrates an example of processing of drawing an auxiliary line so as to be superimposed on an image p11 being captured by the imaging unit 102, by performing image processing on the image p11. The image processing apparatus 100 causes the image p11 being captured by the imaging unit 102, to pass through a predetermined filter for edge detection, to generate an image p12. Then, the image processing apparatus 100 performs edge detection on the image p12, and draws an auxiliary line s11 at an edge having the longest linear portion, for example.

The image processing apparatus 100 can naturally perform the parallel shift processing, the rotational shift processing, and the accuracy improvement processing also on the auxiliary line sit drawn in this manner, in accordance with an operation of the user.

The image processing apparatus 100 may save an auxiliary line that the user is caused to draw, into the storage unit 108, or save the auxiliary line into an external device via the communication unit 112. The image processing apparatus 100 may automatically save the auxiliary line, or may save the auxiliary line in accordance with a predetermined operation of the user. When saving the auxiliary line, the image processing apparatus 100 may save the auxiliary line together with position information, information regarding a direction, and the like.

In addition, the image processing apparatus 100 may read out a saved auxiliary line in accordance with a predetermined operation of the user. In addition, when reading out an auxiliary line, the image processing apparatus 100 may decide an auxiliary line to be read out, using current position information of the image processing apparatus 100 and information regarding a direction of the image processing apparatus 100. If information regarding a position and a direction of the image processing apparatus 100 that has set an auxiliary line is saved together with information regarding the auxiliary line, the image processing apparatus 100 can read out an auxiliary line that corresponds to or is similar to the information regarding the position and the direction. When reading out an auxiliary line, by deciding an auxiliary line to be read out, using the current position information of the image processing apparatus 100 and the information regarding the direction of the image processing apparatus 100, it becomes possible for the image processing apparatus 100 to cause the user to use an auxiliary line set by another user, as a reference of image capturing.

In addition, when saving a captured image into the storage unit 108, the image processing apparatus 100 may save an image being in a state in which an auxiliary line set by the user is superimposed. By saving an image being in a state in which an auxiliary line set by the user is superimposed, the image processing apparatus 100 can cause the user to check how the auxiliary line is utilized for a captured image.

In accordance with a predetermined operation of the user that is performed using the input unit 106, or a predetermined gesture operation, the image processing apparatus 100 may display another auxiliary line related to an auxiliary line drawn on the display unit 110. For example, in accordance with a predetermined operation of the user that is performed using the input unit 106, or a predetermined gesture operation, the image processing apparatus 100 may newly draw another auxiliary line at a position line-symmetric in a horizontal direction or a vertical direction of the display unit 110, when viewed from an auxiliary line drawn on the display unit 110. By drawing a new auxiliary line at a line-symmetric position, the image processing apparatus 100 can serve as aid in performing image capturing using a vertically-balanced or horizontally-balanced composition.

As an auxiliary line, the image processing apparatus 100 can cause the user to draw, on the display unit 110, a figure other than a straight line. For example, as an auxiliary line, the image processing apparatus 100 may cause the user to freely draw a line on the display unit 110. In addition, aside from an operation of drawing a line, in accordance with an operation of drawing a precise circle or an ellipse, and an operation of drawing other figures such as a regular triangle or a regular tetragon, the image processing apparatus 100 may draw these figures on the display unit 110 as auxiliary lines. In addition, for example, in a state in which a plurality of lines are drawn on the display unit 110 as auxiliary lines, when end portions of the respective lines are connected by an operation of the user, the image processing apparatus 100 may draw an auxiliary line on the display unit 110, using the connected lines as one figure.

The image processing apparatus 100 may change a color, a line type, and a shape of an auxiliary line in accordance with an image capturing mode set at the time of image capturing. The image capturing mode is provided for automatically setting parameters such as an aperture, a shutter speed, an ISO sensitivity, white balance, color tone, saturation, with or without face recognition, with or without electronic flash emission, and with or without slow synchronization, in accordance with a subject of image capturing or a situation at the time of image capturing, when an image of the subject is captured using the image processing apparatus 100.

For example, in a case where the user has selected, as an image capturing mode, a mode suitable for image capturing of a landscape, the image processing apparatus 100 may cause the user to draw an auxiliary line not linearly but freehand. This is because a landscape of nature often includes not straight lines but curve lines. In addition, for example, in a case where the user has selected, as an image capturing mode, a mode suitable for image capturing of a person, the image processing apparatus 100 may cause the user to draw an auxiliary line not into a straight line but into a precise circle or an ellipse so as to enclose a face of a person.

Note that the image processing apparatus 100 may change a color, a line type, and a shape of an auxiliary line depending on the settings of a shutter speed and an aperture that are set by the user, in addition to an image capturing mode set at the time of image capturing.

The image processing apparatus 100 may change candidates of an auxiliary line that the user is caused to draw, depending on an attitude obtained from sensor data acquired by the sensor unit 104, and with or without the fixing to a tripod stand. For example, from the sensor data acquired by the sensor unit 104, the image processing apparatus 100 may change candidates of an auxiliary line that the user is caused to draw, in accordance with whether the image processing apparatus 100 is oriented vertically or horizontally.

In addition, the image processing apparatus 100 may change a line type, a shape, and the like of an auxiliary line that the user is caused to draw, depending on whether an image to be captured is a still image or a moving image. This is because a shape and a form of an auxiliary line desired by the user sometimes vary depending on whether an image to be captured is a still image or a moving image.

In addition, the image processing apparatus 100 may change a line type, a shape, and the like of an auxiliary line that the user is caused to draw, on the basis of a recognition result of an image being captured by the imaging unit 102. The control unit 118 can execute the recognition of an image being captured by the imaging unit 102. The image processing apparatus 100 may recognize an image being captured by the imaging unit 102, and if a face of a person is included in the image being captured by the imaging unit 102, the image processing apparatus 100 may cause the user to draw an auxiliary line not into a straight line but into a precise circle or an ellipse so as to enclose the face of the person.

In addition, the image processing apparatus 100 may change candidates of an auxiliary line that the user is caused to draw, in accordance with characteristics of a lens included in the imaging unit 102 (attached to the image processing apparatus 100 in a case where the lens is detachable). For example, the image processing apparatus 100 may change candidates of an auxiliary line that the user is caused to draw, in accordance with whether a lens included in the imaging unit 102 is a normal lens being a lens of a perspective projection method, or a fisheye lens being a lens of an equidistant projection method.

The control unit 118 can identify what type of lens is attached to the image processing apparatus 100, in advance or through communication with the lens. For example, if a lens such as a fisheye lens that causes large distortion in a captured image is included in the imaging unit 102, the image processing apparatus 100 may draw, on the display unit 110, not a linear auxiliary line but an arc-like auxiliary line in accordance with an operation of the user.

The aforementioned drawing of an auxiliary line may be performed by, for example, a mobile terminal such as a smartphone or a tablet terminal that performs an image capturing instruction in cooperation with a camera. For example, a mobile terminal that displays an image captured by a camera may perform processing of drawing an auxiliary line on a screen in accordance with an operation of the user.

When images of the same subject are captured using a plurality of image processing apparatuses 100, an auxiliary line may be interlocked with the other image processing apparatuses 100. FIG. 21 is an explanatory diagram illustrating an example of a state in which four image processing apparatuses 100a to 100d are capturing images of the same subject.

When the image processing apparatus 100a draws an auxiliary line on the display unit 110 in accordance with an operation of the user, the image processing apparatus 100a may transmit information regarding the auxiliary line, to the other image processing apparatuses 100b to 100d. The image processing apparatuses 100b to 100d that have received the information regarding the auxiliary line, from the image processing apparatus 100a may draw auxiliary lines on the respective display units 110 in accordance with the position at which the image processing apparatus 100a has drawn the auxiliary line.

In this manner, by interlocking information regarding an auxiliary line, between apparatuses, when images of the same subject are captured using a plurality of image processing apparatuses 100, position alignment of the subject becomes easier. For example, in a case where positions in the vertical direction of a subject in an image are desired to be aligned, when the positions of the auxiliary lines are interlocked between the plurality of image processing apparatuses 100a to 100d in this manner, the position alignment can become easier.

The aforementioned drawing processing of an auxiliary line that is performed by the image processing apparatus 100 can also be used for medical purposes, for example. For example, by applying the aforementioned processing of the image processing apparatus 100 in an endoscopic surgery system that performs surgery while capturing an in-vivo image of a patient using an endoscope, an auxiliary line can be drawn on a screen that displays an image captured by the endoscope, in accordance with an operation of an operator.

On the basis of a predetermined operation of the user, the image processing apparatus 100 may delete auxiliary lines drawn on the display unit 110, one by one, or may delete all the auxiliary lines. In addition, in accordance with a predetermined operation of the user, the image processing apparatus 100 may copy an auxiliary line drawn on the display unit 110. In a case where a plurality of auxiliary lines drawn freehand by the user are desired to be used, the copying function of an auxiliary line is useful.

2. Conclusion

As described above, according to the embodiment of the present disclosure, there is provided the image processing apparatus 100 that arbitrarily draws, on a screen, an auxiliary line serving as aid for image capturing, in accordance with an operation of the user. The image processing apparatus 100 according to the embodiment of the present disclosure detects an operation performed by touching or approaching of a finger or the like of the user that is performed on the display unit 110, for example, and performs the drawing of an auxiliary line on the display unit 110 in accordance with the content of the detected operation.

By arbitrarily drawing, on a screen, an auxiliary line serving as aid for image capturing, in accordance with an operation of the user in the above-described manner, the image processing apparatus 100 according to the embodiment of the present disclosure can display an auxiliary line desired by the user at the time of image capturing.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an input device on which the user performs a drawing operation of an auxiliary line may be a device worn by the user, such as a glasses-type wearable device or a head mounted display (HMD), and various inputs may be performed for the drawing of an auxiliary line in accordance with a gesture and a visual line of the user that are detected by these devices. In addition, an input device on which the user performs a drawing operation of an auxiliary line may be a camera that can detect a motion of the user. Various inputs for the drawing of an auxiliary line can be performed in accordance with a gesture and a visual line of the user that are detected from a video captured by the camera. In addition, an input device on which the user performs a drawing operation of an auxiliary line may be a microphone that can collect voice of the user. Various inputs for the drawing of an auxiliary line can be performed by a sound via the microphone.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A display control apparatus including:

a control unit configured to control a display mode on a screen of an auxiliary line serving as aid for composition decision at a time of image capturing, in accordance with an operation of a user that is performed on a screen.

(2)

The display control apparatus according to (1), in which the control unit causes the auxiliary line to be displayed so as to be superimposed on a through image displayed on the screen.

(3)

The display control apparatus according to (1) or (2), in which an operation performed by the user is touching or approaching of an operation member to the screen.

(4)

The display control apparatus according to any one of (1) to (3), in which the control unit causes an auxiliary line to be displayed on the screen on a basis of a recognition result of a subject.

(5)

The display control apparatus according to any one of (1) to (4), in which the control unit controls display of the auxiliary line on a screen in accordance with a mode set at a time of image capturing.

(6)

The display control apparatus according to (5), in which the control unit changes a shape of the auxiliary line in accordance with the mode.

(7)

The display control apparatus according to (5) or (6), in which the control unit changes a line type of the auxiliary line in accordance with the mode.

(8)

The display control apparatus according to any one of (1) to (7), in which the control unit controls a display mode of an auxiliary line displayed on another apparatus, in response to the operation.

(9)

The display control apparatus according to any one of (1) to (8), in which, when displaying the auxiliary line on the screen in accordance with the operation that has been detected, the control unit causes another auxiliary line related to an already-displayed auxiliary line to be displayed.

(10)

The display control apparatus according to (9) in which, when displaying the auxiliary line on the screen in accordance with the detected operation, the control unit causes another auxiliary line to be displayed so as to be line-symmetric in the screen.

(11)

The display control apparatus according to any one of (1) to (10), in which the control unit controls display of the auxiliary line on a screen in accordance with a characteristic of a lens used at a time of image capturing.

(12)

The display control apparatus according to (11), in which the control unit controls display of the auxiliary line on a screen in accordance with whether a lens used at a time of image capturing is a lens of a perspective projection method or not a lens of the perspective projection method.

(13)

The display control apparatus according to any one of (1) to (12), in which the control unit controls display of the auxiliary line on a screen on a basis of position information at a time of image capturing.

(14)

The display control apparatus according to (13), in which the control unit acquires information regarding an auxiliary line created in another apparatus, on a basis of position information, and controls display of the auxiliary line on a screen using the acquired information.

(15)

The display control apparatus according to any one of (1) to (14), in which the control unit controls display of the auxiliary line on the screen in accordance with detection of a predetermined gesture operation performed on the screen.

(16)

A display control method including:
controlling a display mode on a screen of an auxiliary line serving as aid for composition decision at a time of image capturing, in accordance with an operation of a user that is performed on a screen.

(17)

A computer program for causing a computer to execute:
controlling a display mode on a screen of an auxiliary line serving as aid for composition decision at a time of image capturing, in accordance with an operation of a user that is performed on a screen.

REFERENCE SIGNS LIST 100 image processing apparatus
102 imaging unit
104 sensor unit
106 input unit
108 storage unit
110 display unit
112 communication unit
116 bus
118 control unit

The invention claimed is:

1. A display control apparatus comprising:
a memory; and
a processor configured to:
  obtain through images and control a display screen to display the through images; and
  while sequentially displaying the through images:
    when the start of a continuous operation of a user is detected, control the display screen to draw an auxiliary line serving as an aid for an image capturing composition decision in accordance with the continuous operation of the user such that the drawing of the auxiliary line begins before the continuous operation of the user has ended; and
    based on detecting that the continuous operation of the user has ended, stop the drawing of the auxiliary line, wherein the auxiliary line is drawn linearly in a case that a first display mode is set, and the auxiliary line is drawn non-linearly in a case that a second display mode that is different than the first display mode is set.

2. The display control apparatus according to claim 1, wherein the processor is further configured to control the display screen such that the auxiliary line is displayed as superimposed on the through images displayed on the display screen.

3. The display control apparatus according to claim 1, wherein the continuous operation performed by the user includes touching of or approaching of an operation member to the display screen.

4. The display control apparatus according to claim 1, wherein the processor is further configured to control the display screen such that a curved line type auxiliary line is displayed on the display screen when a face of a person is recognized by the processor.

5. The display control apparatus according to claim 1, wherein the non-linear auxiliary line is drawn, and the non-linear auxiliary line is one of: a freehand line type or a curved line type.

6. The display control apparatus according to claim 5, wherein the non-linear auxiliary line is the freehand line type.

7. The display control apparatus according to claim 5, wherein the processor is further configured to control the display screen to change a line type of the auxiliary line in accordance with a type of the displayed through images.

8. The display control apparatus according to claim 1, wherein the processor is further configured to transmit, to another apparatus, position information regarding a position of the auxiliary line.

9. The display control apparatus according to claim 1, wherein the processor is further configured to:
when another user operation is detected after the continuous operation, control the display screen to display another auxiliary line related to the already-displayed auxiliary line.

10. The display control apparatus according to claim 9, wherein the other auxiliary line is displayed so as to be line-symmetric to the already-displayed auxiliary line in the display screen.

11. The display control apparatus according to claim 1, wherein the processor is further configured to control the display screen to display the auxiliary line in accordance with a characteristic of a lens used for image capturing.

12. The display control apparatus according to claim 11, wherein the processor is further configured to control the display screen to display the auxiliary line in accordance with whether the lens used for image capturing is a lens of a perspective projection method or a lens that is different than the lens of the perspective projection method.

13. The display control apparatus according to claim 1, wherein the processor is further configured to control the display screen to display the auxiliary line based on position information.

14. The display control apparatus according to claim 13, wherein the processor is further configured to acquire position information regarding an auxiliary line created in another apparatus, and control the display screen to display the auxiliary line based on the acquired position information.

15. The display control apparatus according to claim 1, wherein the processor is further configured to control the display screen to display the auxiliary line in accordance with detection of a predetermined gesture operation performed on the display screen.

16. The display control apparatus according to claim 1, wherein the non-linear auxiliary line is drawn, and the non-linear auxiliary line is a curved line.

17. The display control apparatus according to claim 1, wherein the non-linear auxiliary line is drawn, and the non-linear auxiliary line is an ellipse.

18. The display control apparatus according to claim 1, wherein the non-linear auxiliary line is drawn, and the non-linear auxiliary line is a freehand line type where a shape of the auxiliary line corresponds to a path indicated by the continuous operation of the user.

19. A display control method comprising:
obtaining through images and controlling a display screen to display the through images; and
while sequentially displaying the through images:
  when the start of a continuous operation of a user is detected, controlling the display screen to draw an auxiliary line serving as an aid for an image capturing composition decision in accordance with the continuous operation of the user such that the drawing of the auxiliary line begins before the continuous operation of the user has ended; and
  based on detecting that the continuous operation of the user has ended, stopping the drawing of the auxiliary line, wherein the auxiliary line is drawn linearly in a case that a first image capturing mode is set, and the auxiliary line is drawn non-linearly in a case that a second image capturing mode that is different than the first image capturing mode is set.

20. A non-transitory computer-readable medium storing instructions that, when executed by a processor of a computer, cause the processor to execute operations comprising:

obtaining through images and controlling a display screen to display the through images; and while sequentially displaying the through images:

when the start of a continuous operation of a user is detected, controlling the display screen to draw an auxiliary line serving as an aid for an image capturing composition decision in accordance with the continuous operation of the user such that the drawing of the auxiliary line begins before the continuous operation of the user has ended; and based on detecting that the continuous operation of the user has ended, stopping the drawing of the auxiliary line, wherein the auxiliary line is drawn linearly in a case that a first image capturing mode is set, and the auxiliary line is drawn non-linearly in a case that a second image capturing mode that is different than the first image capturing mode is set.

* * * * *